(12) United States Patent
Quintanilla

(10) Patent No.: US 8,875,279 B2
(45) Date of Patent: Oct. 28, 2014

(54) PASSWORDS FOR TOUCH-BASED PLATFORMS USING TIME-BASED FINGER TAPS

(71) Applicant: Dell Products L.P., Round Rock, TX (US)

(72) Inventor: Frank Quintanilla, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/761,898

(22) Filed: Feb. 7, 2013

(65) Prior Publication Data
US 2014/0223549 A1    Aug. 7, 2014

(51) Int. Cl.
*G06F 21/00*  (2013.01)
*G06F 21/31*  (2013.01)

(52) U.S. Cl.
CPC ..................................... *G06F 21/31* (2013.01)
USPC ................... 726/16; 726/1; 726/19; 713/155; 380/258

(58) Field of Classification Search
USPC ....................................................... 726/1, 16
See application file for complete search history.

(56) References Cited

U.S. PATENT DOCUMENTS

| | | | |
|---|---|---|---|
| 6,421,453 B1 * | 7/2002 | Kanevsky et al. | 382/115 |
| 6,941,001 B1 * | 9/2005 | Bolle et al. | 382/124 |
| 8,625,796 B1 * | 1/2014 | Ben Ayed | 380/258 |
| 8,726,366 B2 * | 5/2014 | Levien et al. | 726/16 |
| 2008/0168403 A1 * | 7/2008 | Westerman et al. | 715/863 |
| 2012/0066650 A1 * | 3/2012 | Tirpak et al. | 715/863 |
| 2012/0166944 A1 * | 6/2012 | Cotterill | 715/702 |
| 2012/0316406 A1 * | 12/2012 | Rahman et al. | 600/301 |
| 2013/0113709 A1 * | 5/2013 | Wine | 345/169 |
| 2013/0172022 A1 * | 7/2013 | Seymour et al. | 455/458 |
| 2013/0179681 A1 * | 7/2013 | Benson et al. | 713/155 |

* cited by examiner

*Primary Examiner* — Morshed Mehedi
(74) *Attorney, Agent, or Firm* — Terrile, Cannatti, Chambers & Holland, LLP; Stephen A. Terrile

(57) ABSTRACT

A gesture-based method is disclosed for authenticating a user. More specifically, the user of an information handling system is prompted to enter a passcode finger tap sequence input gesture via a touch-sensitive device. The finger tap sequence input gesture is processed to generate a passcode finger tap sequence. The passcode finger tap sequence is then compared to a previously-generated authentication finger tap sequence. If the two finger tap sequences match, then the user is authenticated.

15 Claims, 4 Drawing Sheets

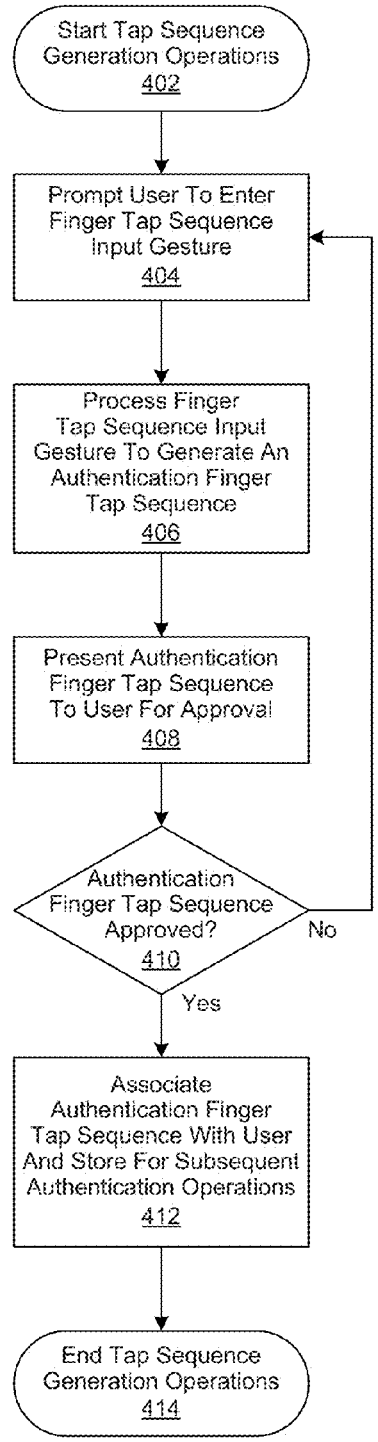
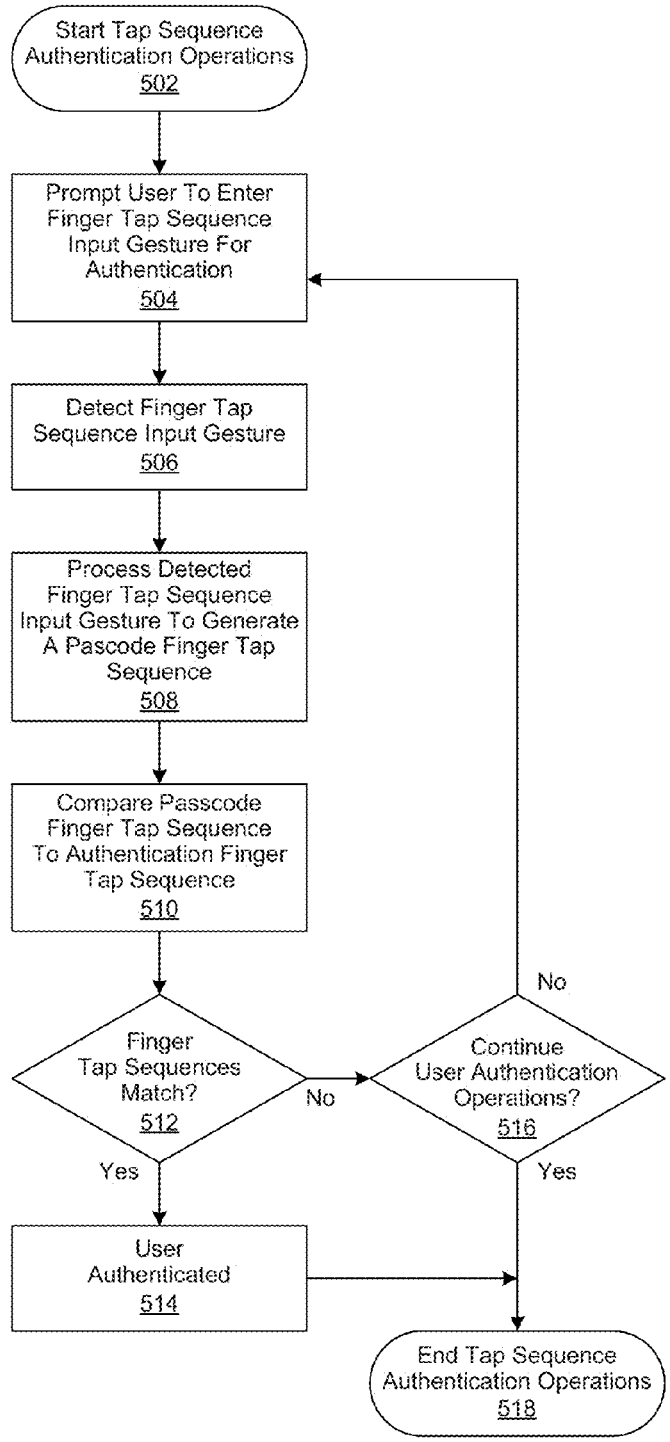
*Figure 4*  *Figure 5*

PASSWORDS FOR TOUCH-BASED PLATFORMS USING TIME-BASED FINGER TAPS

BACKGROUND OF THE INVENTION

1. Field of the Invention

The present invention relates to the field of information handling systems and more particularly to input gestures used with information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, there has been a growing awareness of the importance of ensuring the security of information handling systems of all kinds. In response, various approaches to authentication have evolved, including text-based passwords, security tokens (e.g., smartcards, dongles, etc.), and biometrics (e.g., fingerprint readers, retina scanners, etc.). However, the recent advent of portable devices such as cell phones, portable digital assistants (PDAs), and tablet computers pose challenges when implementing these approaches.

As an example, many of these devices now incorporate a touch-sensitive screen that can be used as a "virtual" keyboard, which can prove cumbersome to use when entering a text-based password. As a result, some users do not like to use, and are slowed down, by these virtual keyboards. Furthermore, many of these devices also lack biometric readers or ports suitable for the implementation of security tokens.

SUMMARY OF THE INVENTION

In accordance with the present invention, a gesture-based method for authenticating a user is disclosed. More specifically, the gesture-based method for authenticating a user includes using a predetermined sequence of finger taps instead of a traditional text-based, smartcard or biometric method of user authentication. In various embodiments, a sequence of finger taps is entered by the user via a touch-sensitive device, which is then processed to generate an authentication finger tap sequence. The resulting authentication finger tap sequence is similar to musical notation, with each finger tap having a corresponding timecode.

The same sequence of finger taps is then used to authenticate the user. More specifically, in one embodiment, the user of an information handling system is prompted to use a touch-sensitive device to enter a finger tap sequence input gesture for authentication. Once detected, the finger tap sequence input gesture is processed to generate a passcode finger tap sequence. The passcode finger tap sequence is then compared to the previously generated authentication finger tap sequence. If the two finger tap sequences match (i.e., the passcode finger tap sequence corresponds to the previously generated authentication finger tap sequence), then the user is authenticated.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows a flowchart of authentication finger tap sequence generation operations; and FIG. 5 shows a flowchart of finger tap sequence authentication operations.

DETAILED DESCRIPTION

A gesture-based method is disclosed for authenticating a user of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, on or more network ports for communicating with external devices as well as various input and output (I/O) devices, such as a keyboard, a mouse, and a video display. The information handling system may also include one or more buses operable to transmit communications between the various hardware components.

Figure 1:
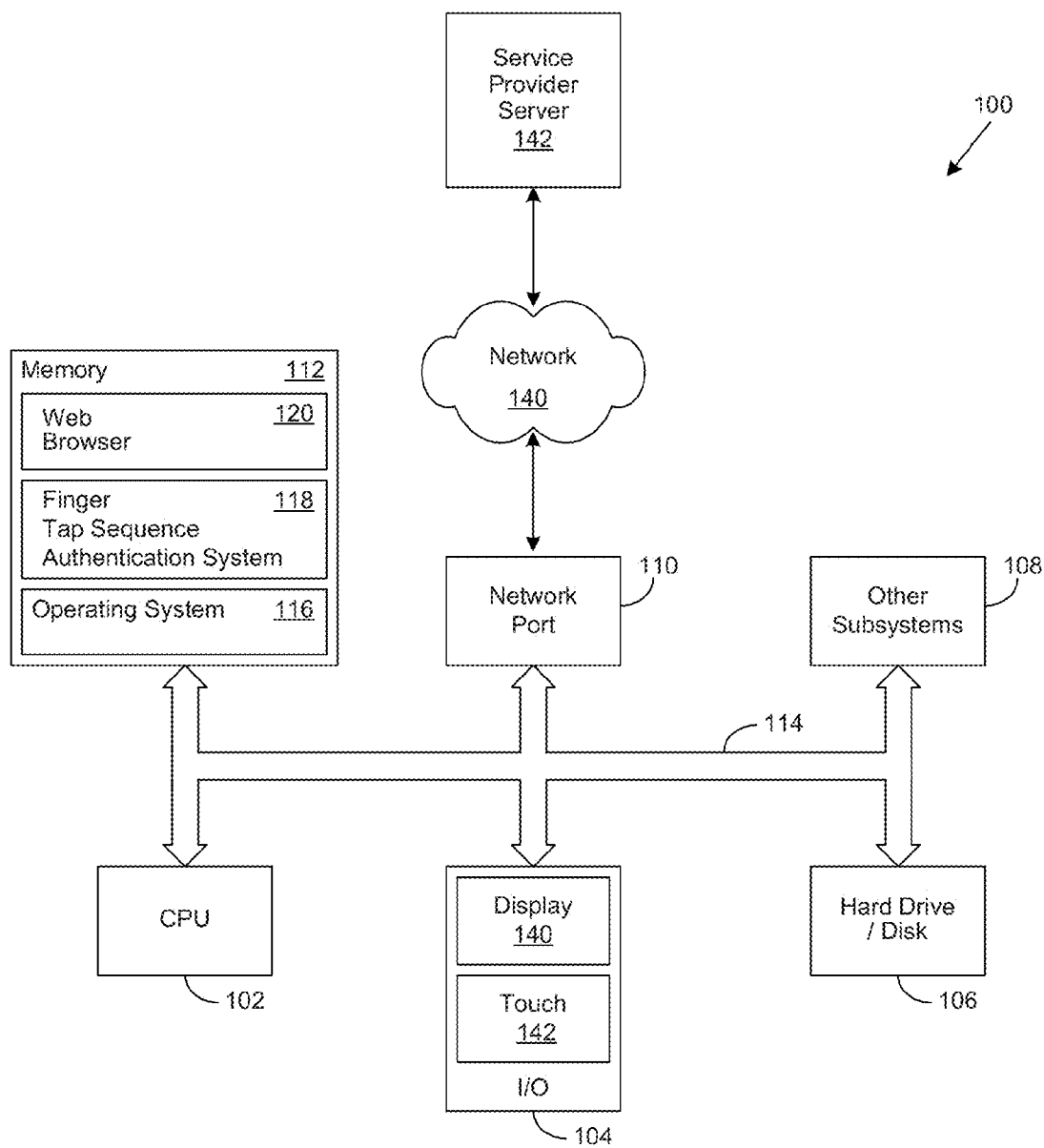
FIG. 1 shows a block diagram of an information handling system having a system for finger tap sequence authentication.

FIG. 1 shows a block diagram of an information handling system having a system for finger tap sequence authentication that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. The I/O devices further include a display device 140 as well as a touch sensitive input device 142. The touch sensitive input device 142 may be a touch pad or may be a touch sensitive type display device. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a finger-tap sequence authentication system 118 and a web browser 120. In one embodiment, the information handling system 100 is able to download the finger-tap sequence authentication system 118 from the service provider server 142. In another embodiment, the finger-tap sequence authentication system 118 is provided as a service from the service provider server 142.

Figure 2:
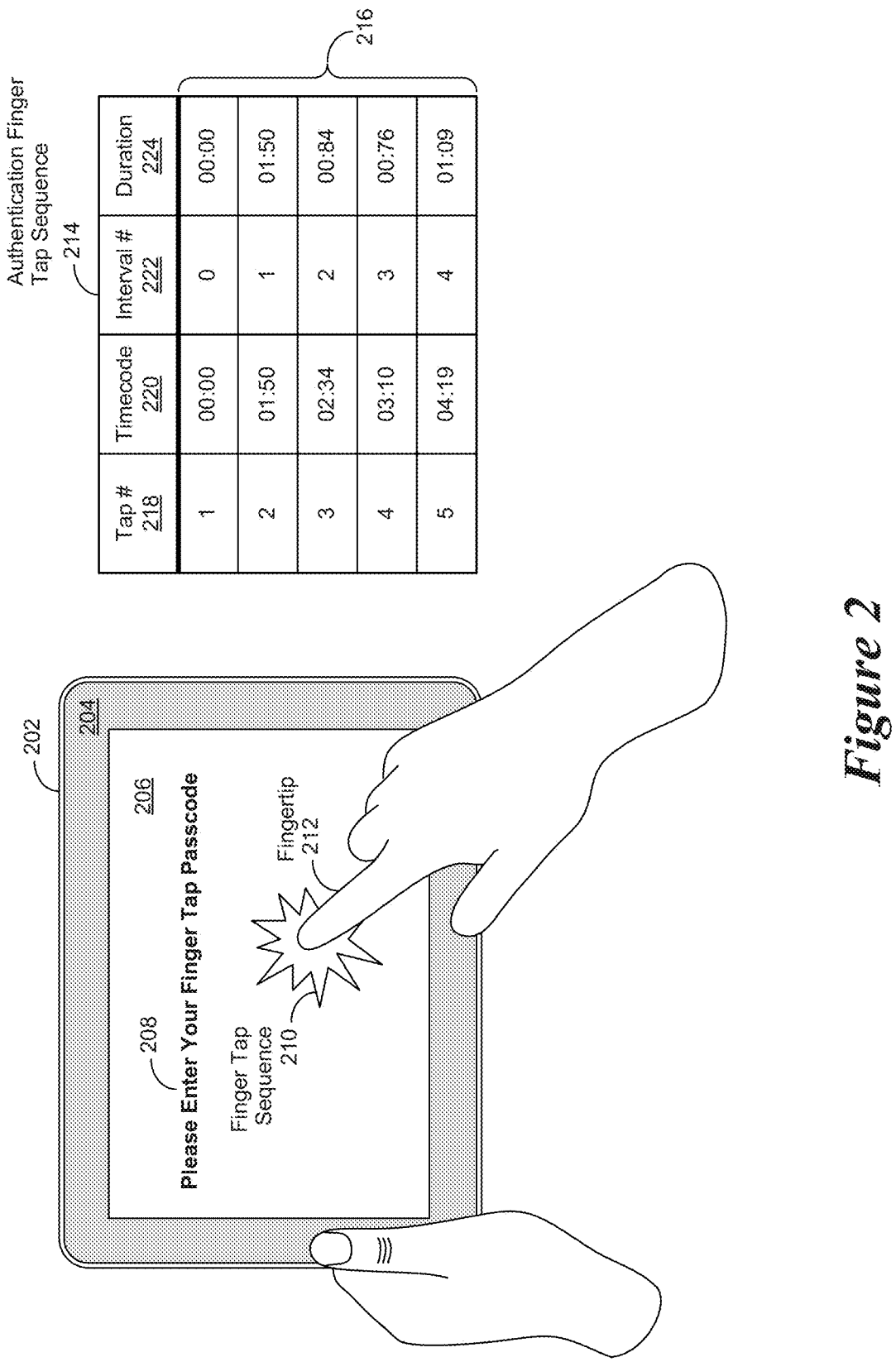
FIG. 2 shows a diagrammatic representation of a touch-sensitive screen used for generating an authentication finger-tap sequence.

FIG. 2 shows a diagrammatic representation of a touch-sensitive screen implemented in accordance with an embodiment of the invention for generating an authentication finger-tap sequence. In various embodiments, a user device 202, such as an information handling system described in greater detail herein, includes a touch sensitive input device, such as a touch pad or a touch sensitive display 204. In these various embodiments, a request 208 is displayed within a user interface 206 of the user device 202, prompting a user to use a finger tap sequence input gesture 210 to enter their finger tap passcode 208. As used herein, a finger tap sequence input gesture 210 refers to a predetermined number of individual finger tap gestures, sequentially separated by a corresponding number of time intervals, on a touch sensitive device. As likewise used herein, a finger tap input gesture refers to a tap of a user's fingertip 212 on a touch sensitive device, such as the touch sensitive display 204.

In this embodiment, the user of the user device 202 is prompted to use the touch-sensitive display 204 enter a finger tap sequence input gesture 210. Once detected, the finger tap sequence input gesture 210 is processed to generate an authentication finger tap sequence 214, which is subsequently used to authenticate the user. As shown in FIG. 2, the authentication finger tap sequence 214 includes a sequence 216 of finger taps 218, each of which has a corresponding timecode 220. As likewise shown in FIG. 2, individual finger taps 218 are separated by a corresponding time interval 222, each of which have a corresponding time duration 224. In one embodiment, the authentication finger tap sequence 214 is locally stored in a target device, such as the user device 202, where it will be used for user authentication. In another embodiment, the authentication finger tap sequence is remotely stored and accessed by one or more target devices, such as the user device 202, which will then use it for user authentication.

Figure 3:
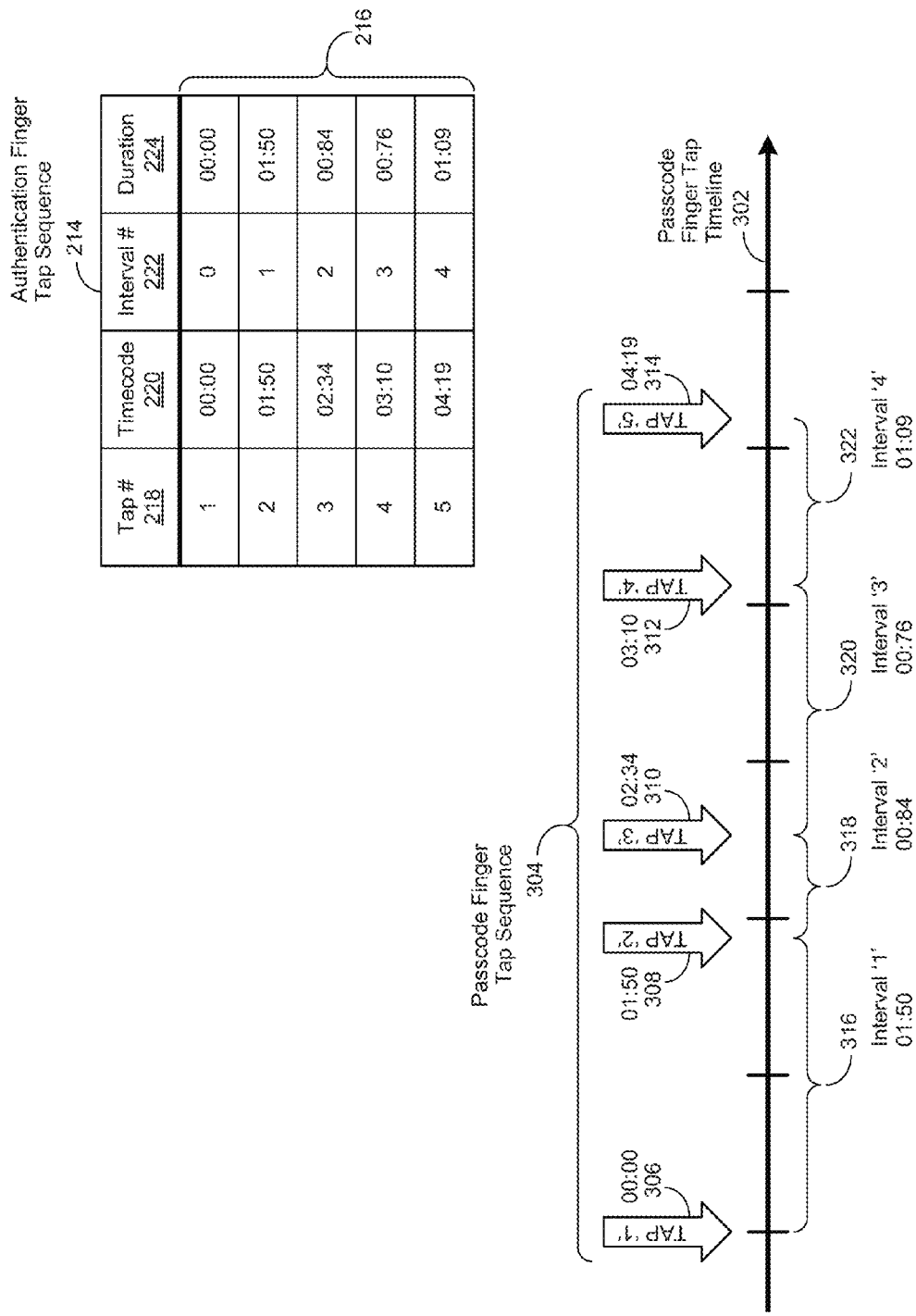
FIG. 3 shows a diagrammatic representation of the timeline of a passcode finger-tap sequence used for authenticating a user.

FIG. 3 shows a diagrammatic representation of the timeline of a passcode finger-tap sequence implemented in accordance with an embodiment of the invention for authenticating a user. In this embodiment, the user of the user device 202 is prompted to use the touch-sensitive display 204 enter a finger tap sequence input gesture 210 for authentication. Once detected, the finger tap sequence input gesture 210 is processed to generate a passcode finger tap sequence 304. As shown in FIG. 3, the passcode finger tap sequence 304 includes individual finger taps '1' 306, '2' 308, '3' 310, '4' 312 and '5' 314, which respectively occur along the passcode finger tap timeline 302 at oo:00, 01:50, 02:34, 03:10 and 04:19 seconds. As likewise shown in FIG. 3, the individual finger taps '1' 306, '2' 308, '3' 310, '4' 312 and '5' 314 are respectively separated by time intervals '1' 316, '2' 318, '3' 320 and '4', 322, which respectively have time durations of 01:50, 00:84, 00:76 and 01:09 seconds.

Comparison operations are then performed to compare the passcode finger tap sequence 304 to the authentication finger tap sequence 214, which has previously been associated with the user as described in greater detail herein. In one embodiment, the individual finger taps '1' 306, '2' 308, '3' 310, '4' 312, '5' 314, and their respective time intervals '1' 316, '2' 318, '3' 320, '4', 322, are compared to the sequence 216 of finger taps 218 and time intervals 222 associated with the authentication finger tap sequence 214. If the passcode finger tap sequence 304 and the authentication finger tap sequence 214 do not match one another, then the user may be prompted to reenter their finger tap sequence input gesture 210. However, if the passcode finger tap sequence 304 and the authentication finger tap sequence 214 do match one another, then the user is authenticated.

In one embodiment, a variability factor is used during the comparison operations to accommodate a user's inability to precisely replicate the finger tap sequence input gesture 210 used to generate the authentication finger tap sequence 214. As an example, a variability factor of 10% may be applied to the time interval durations 224 associated with the authentication finger tap sequence 214. To further the example, the application of a 10% variability would allow an acceptable time interval duration of 01:35 to 01:65 seconds for time interval '1' 316.

FIG. 4 shows a flowchart of finger tap sequence generation operations implemented in accordance with an embodiment of the invention. In this embodiment, authentication finger tap sequence recording operations are begun in step 402, followed by the user of a device being prompted in step 404 to enter a finger tap sequence input gesture for use in subsequent authentication operations. The finger tap sequence input gesture is then processed in step 406 to generate an authentication finger tap sequence. The resulting authentication finger tap sequence is then presented to the user in step 408 for approval, followed by a determination being made in step 410 whether it is approved by the user. If the user does not approve the resulting authentication finger tap sequence, then the process is continued, proceeding with step 404. As an example, the user may be dissatisfied with their original finger tap sequence input gesture and may wish to regenerate the authentication finger tap sequence. However, if it is approved by the user, then the authentication finger tap sequence is associated with the user and then stored for subsequent user authentication operations in step 412. Finger tap sequence generation operations are then ended in step 414.

FIG. 5 shows a flowchart of finger tap sequence authentication operations implemented in accordance with an embodiment of the invention. In this embodiment, finger tap sequence authentication operations are begun in step 502, followed by the user of a device being prompted in step 504 to enter finger tap sequence input gesture for authentication. The finger tap sequence input gesture is detected in step 506 and then processed in step 508 to generate a passcode finger tap sequence. Comparison operations are then performed in step 510 to compare the passcode finger tap sequence to an authentication finger tap sequence previously associated with the user. A determination is then made in step 512 whether or not the passcode finger tap sequence and the authentication finger tap sequence match one another. If so, then the user is authenticated in step 514. Otherwise, a determination is made in step 516 whether to continue finger tap sequence authentication operations. If so, then the process is continued, proceeding with step 504. As an example, the finger tap sequence input gesture may need to be reentered by the user. However, if it is determined in step 516 to end finger tap authentication operations, or once the user is authenticated in step 514, then finger tap authentication operations are ended in step 518.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for authenticating a user, comprising:
    generating a request for a finger tap input gesture from a user, the request being displayed within a user interface;
    detecting a finger tap sequence input gesture in response to the request;
    processing the detected finger tap sequence input gesture to generate a passcode finger tap sequence;
    performing comparison operations to compare the passcode finger tap sequence to an authentication finger tap sequence; and
    authenticating the user if the passcode finger tap sequence corresponds to the authentication finger tap sequence; and wherein
    the passcode finger tap sequence comprises a first set of individual finger tap gestures that are sequentially separated by a corresponding first set of time intervals; and
    the authentication finger tap sequence comprises a second set of individual finger tap gestures that are sequentially separated by a corresponding second set of time intervals.

2. The method of claim 1, wherein:
    the number of individual finger tap gestures in the second set of individual finger tap gestures, and the duration of individual time intervals in the corresponding second set of time intervals, are received as finger tap gesture input data from the user; and
    initiation input data is received from the user to initiate processing of the finger tap gesture input data to generate the authentication finger tap sequence.

3. The method of claim 2, wherein:
    the comparison operations are performed by respectively comparing the first and second sets of individual finger tap gestures and the first and second sets of time intervals.

4. The method of claim 1, wherein:
    the finger tap sequence input gesture is detected by a touch sensitive input device.

5. The method of claim 4, wherein:
    the touch sensitive input device comprises at least one of a touch pad and a touch sensitive display device.

6. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        generating a request for a finger tap input gesture from a user, the request being displayed within a user interface;
        detecting a finger tap sequence input gesture in response to the request;
        processing the detected finger tap sequence input gesture to generate a passcode finger tap sequence;
        performing comparison operations to compare the passcode finger tap sequence to an authentication finger tap sequence; and
        authenticating the user if the passcode finger tap sequence corresponds to the authentication finger tap sequence; and wherein
    the passcode finger tap sequence comprises a first set of individual finger tap gestures that are sequentially separated by a corresponding first set of time intervals; and
    the authentication finger tap sequence comprises a second set of individual finger tap gestures that are sequentially separated by a corresponding second set of time intervals.

7. The system of claim 6, wherein:
    the number of individual finger tap gestures in the second set of individual finger tap gestures, and the duration of individual time intervals in the corresponding second set of time intervals, are received as finger tap gesture input data from the user; and
    initiation input data is received from the user to initiate processing of the finger tap gesture input data to generate the authentication finger tap sequence.

8. The system of claim 7, wherein:
    the comparison operations are performed by respectively comparing the first and second sets of individual finger tap gestures and the first and second sets of time intervals.

9. The system of claim 6, wherein:
    the finger tap sequence input gesture is detected by a touch sensitive input device.

10. The system of claim 9, wherein:
    the touch sensitive input device comprises at least one of a touch pad and a touch sensitive display device.

11. A non-transitory, computer-readable storage medium embodying computer program code, the computer program code comprising computer executable instructions configured for:
- generating a request for a finger tap input gesture from a user, the request being displayed within a user interface;
- detecting a finger tap sequence input gesture in response to the request;
- processing the detected finger tap sequence input gesture to generate a passcode finger tap sequence;
- performing comparison operations to compare the passcode finger tap sequence to an authentication finger tap sequence; and
- authenticating the user if the passcode finger tap sequence corresponds to the authentication finger tap sequence; and wherein
- the passcode finger tap sequence comprises a first set of individual finger tap gestures that are sequentially separated by a corresponding first set of time intervals; and
- the authentication finger tap sequence comprises a second set of individual finger tap gestures that are sequentially separated by a corresponding second set of time intervals.

12. The non-transitory, computer-readable storage medium of claim 11, wherein:
- the number of individual finger tap gestures in the second set of individual finger tap gestures, and the duration of individual time intervals in the corresponding second set of time intervals, are received as finger tap gesture input data from the user; and
- initiation input data is received from the user to initiate processing of the finger tap gesture input data to generate the authentication finger tap sequence.

13. The non-transitory, computer-readable storage medium of claim 12, wherein:
- the comparison operations are performed by respectively comparing the first and second sets of individual finger tap gestures and the first and second sets of time intervals.

14. The non-transitory, computer-readable storage medium of claim 11, wherein:
- the finger tap sequence input gesture is detected by a touch sensitive input device.

15. The non-transitory, computer-readable storage medium of claim 11, wherein:
- the touch sensitive input device comprises at least one of a touch pad and a touch sensitive display device.

* * * * *